United States Patent
Eguchi

(10) Patent No.: US 10,841,457 B2
(45) Date of Patent: Nov. 17, 2020

(54) IMAGE FORMING APPARATUS WITH DENSITY CORRECTION AND EDGE SMOOTHING, METHOD, AND STORAGE MEDIUM STORING PROGRAM TO PERFORM THE METHOD

(71) Applicant: CANON KABUSHIKI KAISHA, Tokyo (JP)

(72) Inventor: Kimimori Eguchi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/788,588

(22) Filed: Oct. 19, 2017

(65) Prior Publication Data

US 2018/0124285 A1 May 3, 2018

(30) Foreign Application Priority Data

Nov. 2, 2016 (JP) .................................. 2016-214943

(51) Int. Cl.
*H04N 1/00* (2006.01)
*H04N 1/60* (2006.01)
(Continued)

(52) U.S. Cl.
CPC ........... *H04N 1/6019* (2013.01); *H04N 1/405* (2013.01); *H04N 1/407* (2013.01); *H04N 1/4092* (2013.01);
(Continued)

(58) Field of Classification Search
CPC .............................. H04N 1/6019; H04N 1/405
See application file for complete search history.

(56) References Cited

U.S. PATENT DOCUMENTS 7,460,274 B2 * 12/2008 Hirano ................... G06K 15/02
358/1.9
8,040,565 B2 * 10/2011 Shibaki ................ H04N 1/6072
358/1.9
(Continued)

FOREIGN PATENT DOCUMENTS

CN  102647535    8/2012
CN  102739917    10/2012
(Continued)

OTHER PUBLICATIONS

CN Office Action dated Jul. 17, 2019 in counterpart CN Application No. 201711059525.2 with English translation.

*Primary Examiner* — Ibrahim Siddo
(74) *Attorney, Agent, or Firm* — Venable LLP

(57) ABSTRACT

To make it possible for image processing to control the thickness of a character or a line to be applied similarly as long as input image data is the same even in the case where the setting of color conversion processing or density correction processing is changed. An apparatus that forms an image on a printing medium by using a color material, the apparatus including: a first image processing unit configured to perform first image processing to change a density of the color material for an input image; a second image processing unit configured to perform second image processing to control a thickness of a text object or a line object included in the input image; and a setting unit configured to acquire a setting of information representing characteristics of the first image processing and to set a parameter in the second image processing in accordance with the acquired setting, and the second image processing unit controls the thickness of the text object or the line object in accordance with the set parameter.

11 Claims, 15 Drawing Sheets

(51) Int. Cl.
*H04N 1/58* (2006.01)
*H04N 1/405* (2006.01)
*H04N 1/407* (2006.01)
*H04N 1/409* (2006.01)

(52) U.S. Cl.
CPC ....... *H04N 1/58* (2013.01); *H04N 2201/0094* (2013.01)

(56) References Cited

U.S. PATENT DOCUMENTS

| | | | |
|---|---|---|---|
| 8,253,981 B2 | 8/2012 | Eguchi | 358/3.1 |
| 8,416,460 B2 | 4/2013 | Eguchi | 358/3.26 |
| 2002/0122191 A1 | 9/2002 | Kitagawara | 358/1.9 |
| 2005/0151984 A1* | 7/2005 | Lee | G06K 15/02 |
| | | | 358/1.9 |
| 2008/0247642 A1 | 10/2008 | Eguchi | 382/167 |
| 2010/0238468 A1* | 9/2010 | Eguchi | H04N 1/58 |
| | | | 358/1.9 |
| 2012/0206756 A1 | 8/2012 | Nakashio | 358/1.14 |
| 2012/0257220 A1 | 10/2012 | Sagimori | 358/1.2 |
| 2012/0287477 A1* | 11/2012 | Ozawa | H04N 1/405 |
| | | | 358/3.13 |
| 2014/0049798 A1 | 2/2014 | Nakai | 358/2.1 |
| 2015/0264221 A1* | 9/2015 | Obara | H04N 1/40068 |
| | | | 358/1.2 |
| 2016/0266512 A1 | 9/2016 | Haruta | G03G 15/043 |
| 2016/0381249 A1* | 12/2016 | Eguchi | H04N 1/4092 |
| | | | 358/2.1 |
| 2016/0381252 A1* | 12/2016 | Kakuta | H04N 1/4092 |
| | | | 358/2.1 |
| 2017/0094099 A1* | 3/2017 | Shibahara | H04N 1/2369 |

FOREIGN PATENT DOCUMENTS

| | | |
|---|---|---|
| CN | 105975998 | 9/2016 |
| JP | 2005-096351 | 4/2005 |
| JP | 2014-039176 | 2/2014 |

\* cited by examiner

BEFORE COLOR CONVERSION
(R,G,B) = (255,0,255 )

AFTER COLOR CONVERSION
(C,M,Y,K)=(0,240,0,0)
(SATURATION)

AFTER COLOR CONVERSION
(C,M,Y,K)=(0,219,0,0)
(PERCEPTUAL)

BEFORE SMOOTHING PROCESSING

AFTER SMOOTHING PROCESSING

CONTONE IMAGE

HALFTONE IMAGE

PARTIALLY ENLARGED DIAGRAM OF HALFTONE IMAGE

DIAGRAM SHOWING STATE WHERE GAP IS FILLED IN

BEFORE COLOR CONVERSION
(R,G,B)=(0,255,255)

AFTER COLOR CONVERSION
(C,M,Y,K)=(210,0,30,0)
(SATURATION)

AFTER COLOR CONVERSION
(C,M,Y,K)=(181,0,60,0)
(PERCEPTUAL)

IMAGE FORMING APPARATUS WITH DENSITY CORRECTION AND EDGE SMOOTHING, METHOD, AND STORAGE MEDIUM STORING PROGRAM TO PERFORM THE METHOD

BACKGROUND OF THE INVENTION

Field of the Invention

The present invention relates to image processing to adjust the thickness of a character (text) or a line.

Description of the Related Art

In printing processing in an image forming apparatus, such as an SFP (Single Function Printer) and an MFP (Multi Function Printer), various kinds of image processing are performed for input image data that is a target of printing. The image processing includes line width adjustment processing to adjust the thickness of a character or a line within input image data by controlling the line width in units of pixels (for example, see Japanese Patent Laid-Open No. 2012-121265). This line width adjustment processing is performed only for a character or a line in a density area determined in advance in order to make the best use of the characteristics and effects of the image forming apparatus.

Normally, the above-described line width adjustment processing is performed after color conversion processing to convert the color space of input image data and density correction processing to correct the density of each pixel. In the color conversion processing and the density correction processing, the pixel value for each color plane changes, and therefore, in the case where the intent setting (specification of a matching method) at the time of color conversion or the setting of a one-dimensional LUT that is used at the time of density correction is changed, there is a possibility that the pixel value after processing becomes outside a predetermined density area that is the target of the line width adjustment processing. For example, the density of a character that is originally the target of the line width adjustment processing falls below a threshold value specifying the target density of the line width adjustment processing as the results of changing the setting in the color conversion processing or the density correction processing, and therefore, a case may occur where the effects of the line width adjustment processing are not obtained. As a result of this, such a problem arises that the thickness of a character or a line changes due to a difference in the above-described setting in the color conversion processing or the density correction processing despite the fact that the input image data is the same. The same problem may arise in relation to processing for the edge portion of an object, which is the processing that affects the apparent thickness of a character or a line as in the line width adjustment processing. An object of the present invention is to make it possible for image processing to control the thickness of a character or a line to be applied similarly provided that input image data is the same even in the case where the setting in the color conversion processing or the density correction processing is changed.

SUMMARY OF THE INVENTION

The apparatus according to the present invention is an apparatus that forms an image on a printing medium by using a color material, the apparatus including: a first image processing unit configured to perform first image processing to change a density of the color material for an input image; a second image processing unit configured to perform second image processing to control a thickness of a text object or a line object included in the input image; and a setting unit configured to acquire a setting of information representing characteristics of the first image processing and to set a parameter in the second image processing in accordance with the acquired setting, and the second image processing unit controls the thickness of the text object or the line object in accordance with the set parameter.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

In the present embodiment, an aspect is explained in which a parameter in line width adjustment processing is changed dynamically in accordance with a setting of color conversion processing or density correction processing and line width adjustment optimum for input image data is implemented irrespective of the setting of the color conversion processing or the density correction processing.

«System Entire Configuration»

Figure 1:
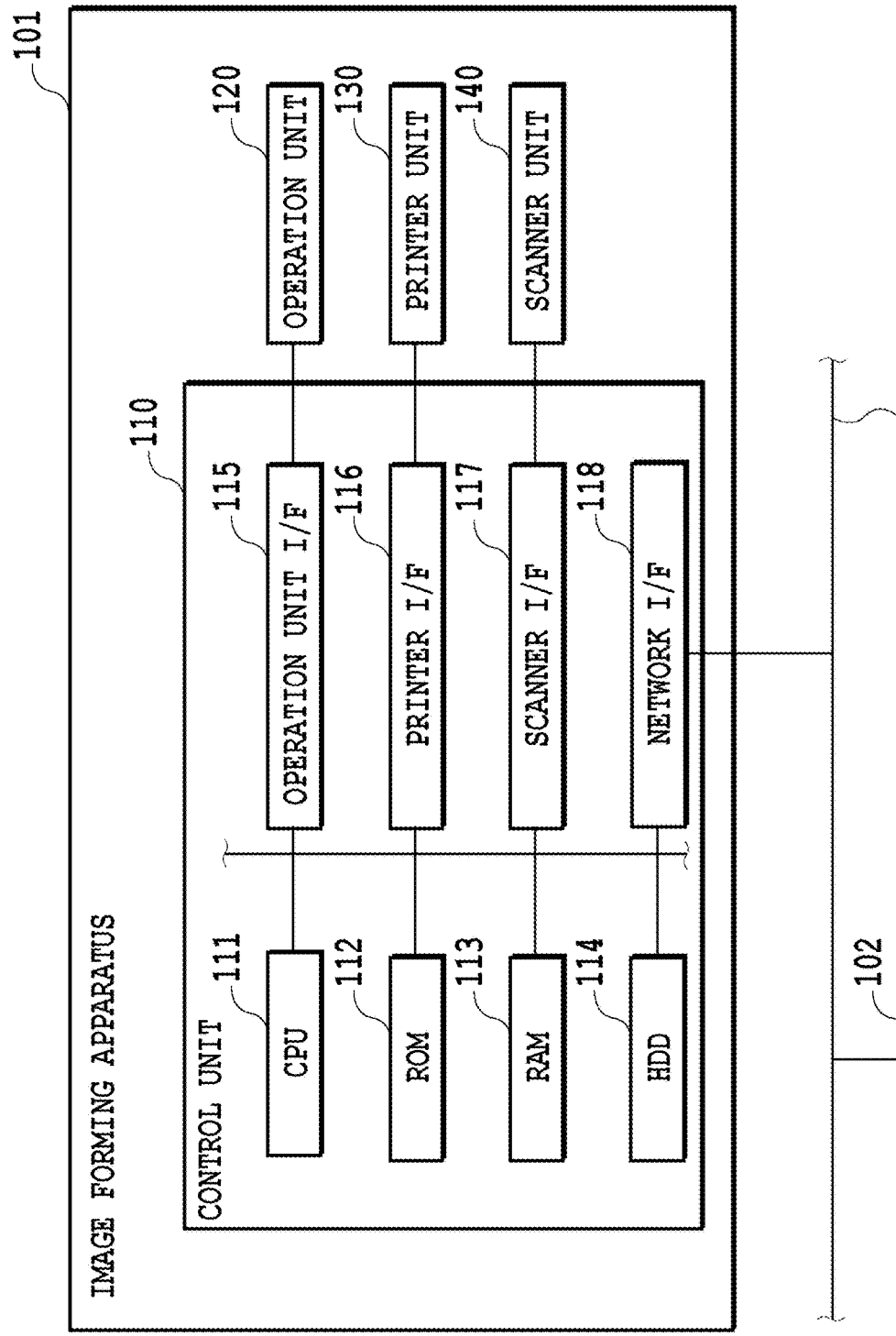
FIG. 1 is an entire configuration diagram of a printing system.

FIG. 1 is an entire configuration diagram of a printing system according to the present embodiment. The printing system shown in FIG. 1 includes an image forming apparatus 101, which is a printer capable also of copy processing, and a PC 102 and both are connected to each other via a LAN 103. Then, from the PC 102, printing-target image data (hereinafter, called "PDL data") described in a page description language (PDL) is transmitted to the image forming apparatus 101 via the LAN 103 and printed and output. Further, in FIG. 1, the internal configuration (hardware configuration) of the image forming apparatus 101 is also shown. In the following, the internal configuration of the image forming apparatus 101 is explained.

A control unit 110 including a CPU 111 controls the operation of the entire image forming apparatus 101. The CPU 111 performs various kinds of control, such as read control and transmission control, by reading control programs stored in a ROM 112. The CPU 111 may be a standalone processor or may be made up of a plurality of processors. A RAM 113 is used as a temporary storage area, such as a main memory and a work area, of the CPU 111.

An HDD 114 stores image data, various programs, or various information tables. An operation unit I/F 115 is an interface that connects an operation unit 120 and the control unit 110. The operation unit 120 includes a liquid crystal display having a touch panel function and a keyboard and is in charge of a user interface function to receive various input operations from a user. Further, the operation unit 120 includes a user authentication unit (not shown schematically) configured to receive an authentication operation in the case where user authentication is performed by an ID card and the like.

A printer I/F 116 is an interface that connects a printer unit 130 and the control unit 110. The image data for which printing processing is performed in the printer unit 130 is input from the control unit 110 via the printer I/F 116. Then, in the printer unit 130, an image in accordance with the input image data is printed on a printing medium, such as paper, by a predetermined method (here, electrophotographic method).

A scanner I/F 117 is an interface that connects a scanner unit 140 and the control unit 110. The scanner unit 140 generates image data (scanned image data) by reading the image on a document set on a document table or ADF (Auto Document Feeder), not shown schematically. The generated scanned image data is input to the control unit 110 via the scanner I/F 117.

A network I/F 118 is an interface that connects the control unit 110 (the image forming apparatus 101) to the LAN 103. The network I/F 118 transmits image data and information to an external device (for example, cloud service server), not shown schematically, on the LAN 103 and receives various kinds of information from an external device on the LAN 103.

«Software Configuration of Image Forming Apparatus»

Figure 2:
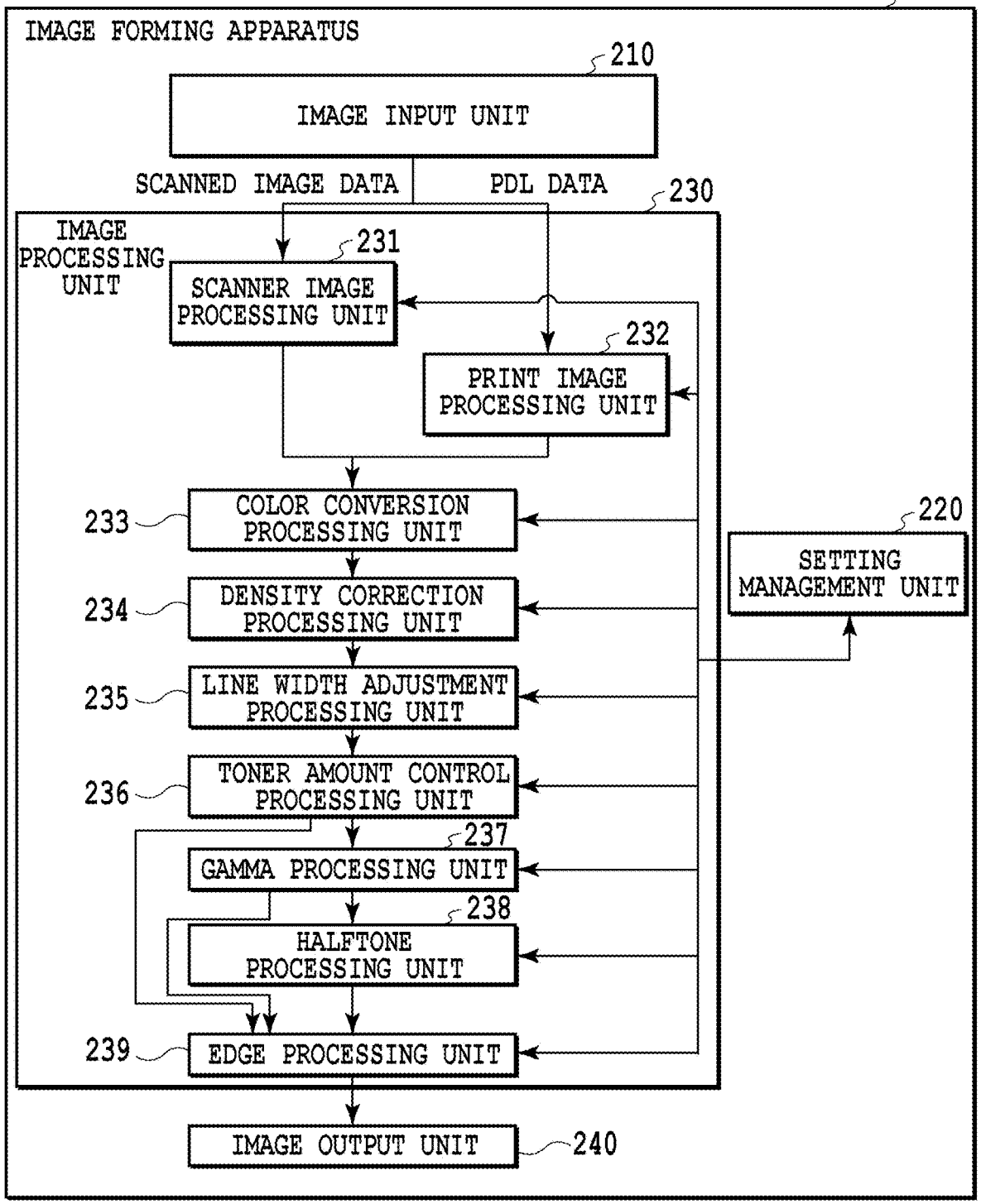
FIG. 2 is a block diagram showing an example of a software configuration of an image forming apparatus.

FIG. 2 is a block diagram showing an example of a software configuration of the image forming apparatus 101. The image forming apparatus 101 includes each function unit of an image input unit 210, a setting management unit 220, an image processing unit 230, and an image output unit 240. Each function unit is implemented by the CPU 111, which is included in the image forming apparatus 101, executing control programs. In the following, each function unit is explained.

The image input unit 210 receives an input of image data in accordance with the copy function and the print function included in the image forming apparatus 101. For example, in the case where the copy function is performed, the image input unit 210 acquires scanned image data from the scanner unit 140 and in the case where the print function is performed, the image input unit 210 acquires PDL data from the PC 102.

The setting management unit 220 manages a variety of setting values for various kinds of image processing performed by the image processing unit 230. Further, the setting management unit 220 also performs display control of various setting values on a user interface screen (UI screen) that is displayed on the operation unit 120.

The image processing unit 230 performs various kinds of image processing in accordance with the functions to be made use of for the image data acquired by the image input unit 210. The image processing unit 230 includes a scanner image processing unit 231, a print image processing unit 232, a color conversion processing unit 233, a density correction processing unit 234, a line width adjustment processing unit 235, a toner amount control processing unit 236, a gamma processing unit 237, a halftone processing unit 238, and an edge processing unit 239. The scanner image processing unit 231 performs image processing that is necessary at the time of performing the copy function, for example, such as MTF correction processing to correct the read MTF that changes depending on the reading speed and image area determination processing to generate attribute information by determining the attribute of each object within an image. Here, the "attribute" includes image (photo), graphics, text (character), line, and so on. The print image processing unit 232 performs image processing that is necessary at the time of performing the print function, for example, such as processing to generate intermediate data by interpreting PDL data and RIP processing to convert the intermediate data into data in the bitmap format that can be interpreted by the printer unit 130. At the time of the RIP processing, processing to generate the above-described attribute information is also performed. The color conversion processing unit 233 performs processing to convert a color space (for example, RGB) of input image data into a color space (for example, CMYK) corresponding to the printer unit 130. Image data whose color space is CMYK at the point in time of being input to the color conversion processing unit 233 is sent to the density correction processing unit 234 as it is. The density correction processing unit 234 performs processing to correct a value (pixel value) indicating the density of each color of CMYK in image data in the CMYK color space. The line width adjustment processing unit 235 performs processing to increase or decrease the line width by adjusting the number of pixels in the width direction of a line in a text object or a line object within an image. The toner amount control processing unit 236 performs processing to control the amount of color material (amount of toner) per unit area, which is used for image formation. The gamma processing unit 237 performs processing to correct the density gradation of the printer unit 130 so as to have characteristics determined in advance. The halftone processing unit 238 performs processing to convert the tone level values (for example, 256 tone levels) of input image data into N values (for example, two values), which are tone levels that can be output by the printer unit 130, of image data (halftone image data). The edge processing unit 239 performs processing to smooth the contour of a character or a line by performing smoothing or jaggy reducing for the edge portion of a text object or a line object.

The image output unit 240 outputs halftone image data as the results of performing various kinds of image processing for input image data to the printer unit 130.

«Image Processing by which Output Pixel Value Changes in Accordance with Setting»

Following the above, the processing of the color conversion processing unit 233 and the density correction processing unit 234, by which the pixel value indicating the density of a color material to be used at the time of printing and outputting input image data changes in accordance with a setting is explained in detail.

<Color Conversion Processing>

Figure 3A:
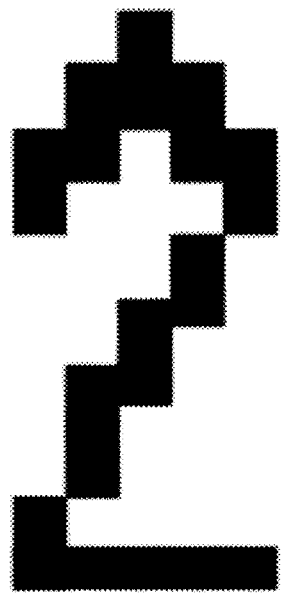
FIG. 3A to FIG. 3C are diagrams showing examples of results of color conversion processing.
Figure 3B:
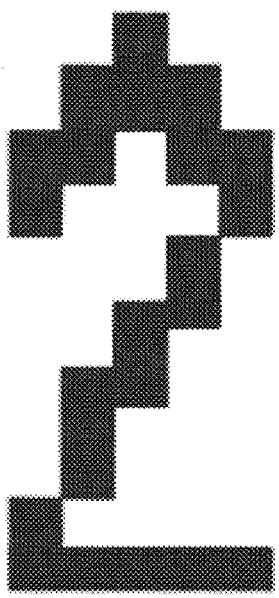
Figure 3C:
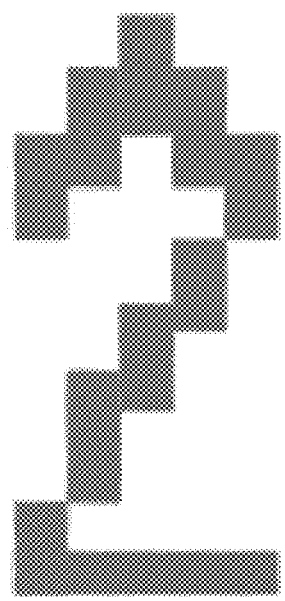

First, conversion processing of a color space in the color conversion processing unit 233 is explained in detail. In this processing, RGB in the color space of an input image is converted into CMYK in the color space handled by the printer unit 130. Here, RGB is converted into the device-independent color space Lab and further, Lab is converted into CMYK. For conversion from RGB into Lab and conversion from Lab into CMYK, respectively, a three-dimensional lookup table (hereinafter, LUT) is used. Then, in the conversion from RGB into Lab, LUTs different in accordance with the contents of intent are prepared so that it is made possible to implement color conversion with a variety of characteristics. Here, as the "intent", preference for perception (Perceptual), preference for saturation (Saturation), maintenance of relative color (Relative Colorimetric), maintenance of absolute color (Absolute Colorimetric), and so on exist. Consequently, in the results of color conversion processing, even in the case where the RGB values of an input image are the same, the CMYK values that are output are different in accordance with the setting of the intent. In the present embodiment, it is assumed that the conversion from Lab into CMYK uses a common LUT irrespective of the intent. Here, the setting of the intent is performed together with printing instructions in the printer driver in the case where, for example, the input image data is PDL data. Alternatively, it is also possible to specify the intent on the UI screen of the operation unit 120. The color conversion processing unit 233 performs color conversion processing in accordance with the intent set via the printer driver and the like and converts RGB values of the input image data into CMYK values corresponding to the printer unit 130. FIG. 3A to FIG. 3C show examples of the results of the color conversion processing. FIG. 3A shows a text object having a density of (R, G, B)=(255, 0, 255) before the color conversion processing is performed. Then, FIG. 3B and FIG. 3C show the results of performing the color conversion processing with "Saturation" and "Perceptual", respectively, for the text object shown in FIG. 3A. With "Saturation", (R, G, B)=(255, 0, 255) is converted into (C, M, Y, K)=(0, 240, 0, 0) and with "Perceptual", (R, G, B)=(255, 0, 255) is converted into (C, M, Y, K)=(0, 219, 0, 0), and it is known that different color conversion results are obtained for the same RGB values in accordance with the contents of the intent.

<Density Correction Processing>

Figure 4:
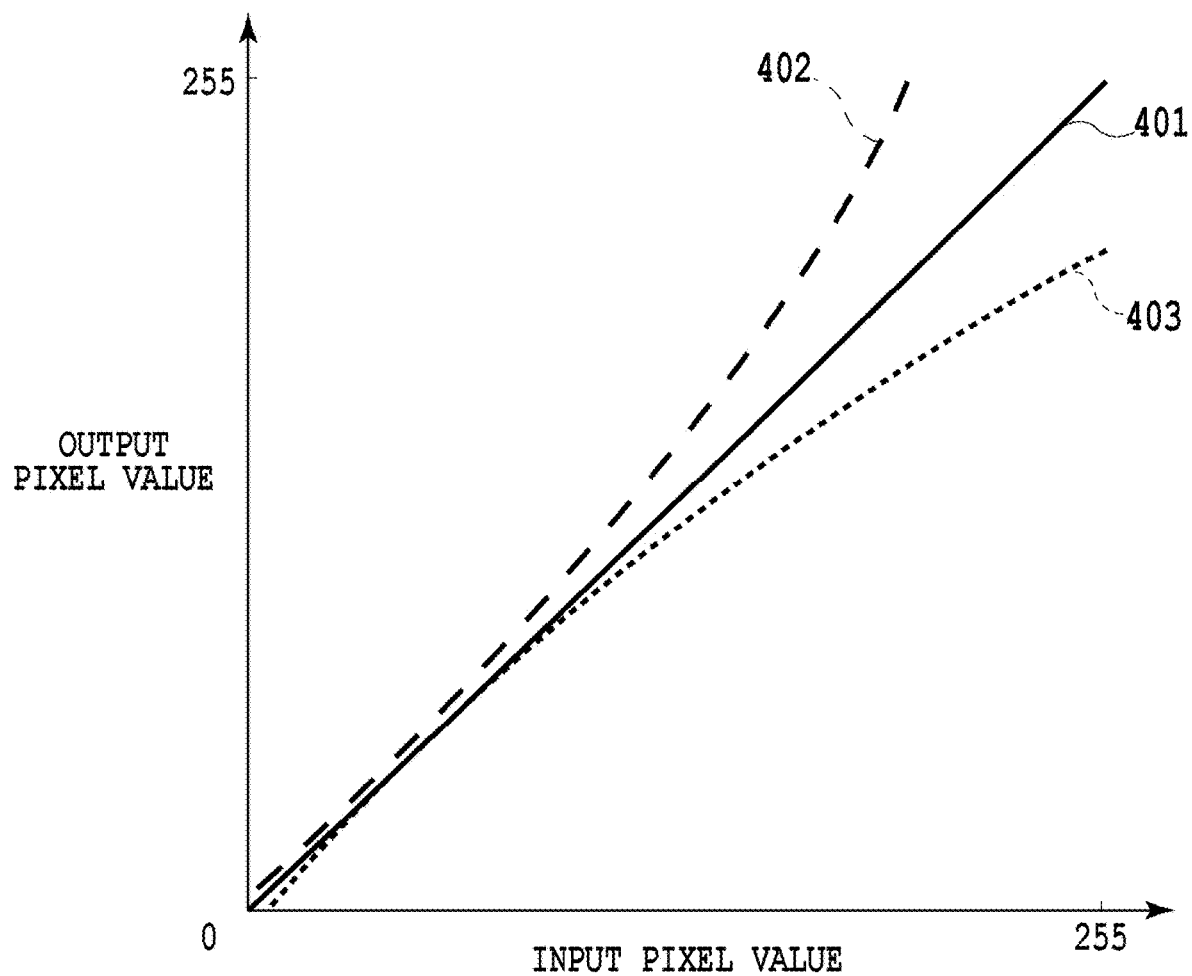
FIG. 4 is a diagram showing examples of one-dimensional LUTs for density correction.

Next, correction processing of the CMYK density after the color conversion in the density correction processing unit 234 is explained in detail. In this processing, for each color of CMYK (each color plane) after the color conversion, the density (pixel value) is changed by using a one-dimensional LUT. FIG. 4 is a diagram showing examples of one-dimensional LUTs for density correction, whose characteristics are different, and the horizontal axis represents the input pixel value and the vertical axis represents the output pixel value. In FIG. 4, a straight line 401 indicates a one-dimensional LUT that is used in the case where the density of input image data is maintained (density is neither increased nor decreased). Then, a curve 402 indicates a one-dimensional LUT that is used in the case where the density of input image data is increased and a curve 403 indicates a one-dimensional LUT that is used in the case where the density is decreased. As described above, depending on the one-dimensional LUT that is used, the pixel value after the density correction becomes different.

«Line Width Adjustment Processing»

Figure 5A:
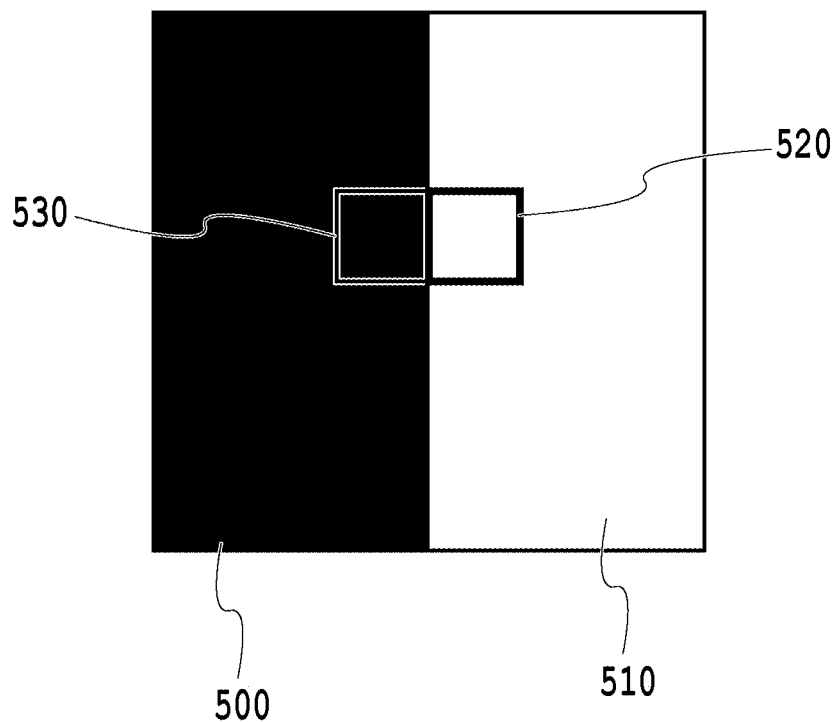
FIG. 5A and FIG. 5B are diagrams explaining principles of line width adjustment processing.
Figure 5B:

Next, processing to adjust the thickness of a character or a line in the line width adjustment processing unit 235 is explained in detail. FIG. 5A and FIG. 5B are diagrams explaining principles of the line width adjustment processing and FIG. 5A shows the case where thickness is increased and FIG. 5B shows the case where thickness is decreased. In FIG. 5A and FIG. 5B, a black area 500 indicates an area (text area) consisting of pixels whose attribute is text and a white area 510 indicates an area (background area) consisting of pixels whose attribute is not text (background pixels).

In the case where the line width is increased in FIG. 5A, each pixel within the background area 510 in contact with the text area 500 is taken to be a pixel of interest and the density of a pixel within the text area 500, which is adjacent to the pixel of interest, is compared with a predetermined threshold value. In the case where the results of the comparison indicate that the density of the adjacent pixel is higher than or equal to the threshold value, the density of the pixel of interest is changed into the density of the adjacent pixel within the text area 500 (replacement of pixel value). In the example in FIG. 5A, the pixel value of a pixel of interest 520 is replaced with the pixel value of an adjacent pixel 530 thereof. Due to this, the pixel making up the background area 510 changes into a pixel making up the text area 500 and the text area 500 extends (=the line width of the character increases). On the other hand, in the case where the line width is decreased in FIG. 5B, each pixel within the text area 500 in contact with the background area 510 is taken to be a pixel of interest and the density of the pixel of interest is compared with a predetermined threshold value. In the case where the results of the comparison indicate that the density of the pixel of interest is higher than or equal to the threshold value, the density of the pixel of interest is changed into the density of the pixel within the background area 510. In the example in FIG. 5B, the pixel value of a pixel of interest 540 is replaced with the pixel value of an adjacent pixel 550 thereof. Due to this, the pixel making up the text area 500 changes into a pixel making up the background area 510 and the text area 500 contracts (=the line width of the character decreases). By the control as above, it is possible to thicken or thin only a character or a line having a predetermined density. It is possible to set whether to perform thickening processing or the thinning processing in the line width adjustment processing on the printer driver.

Figure 6:
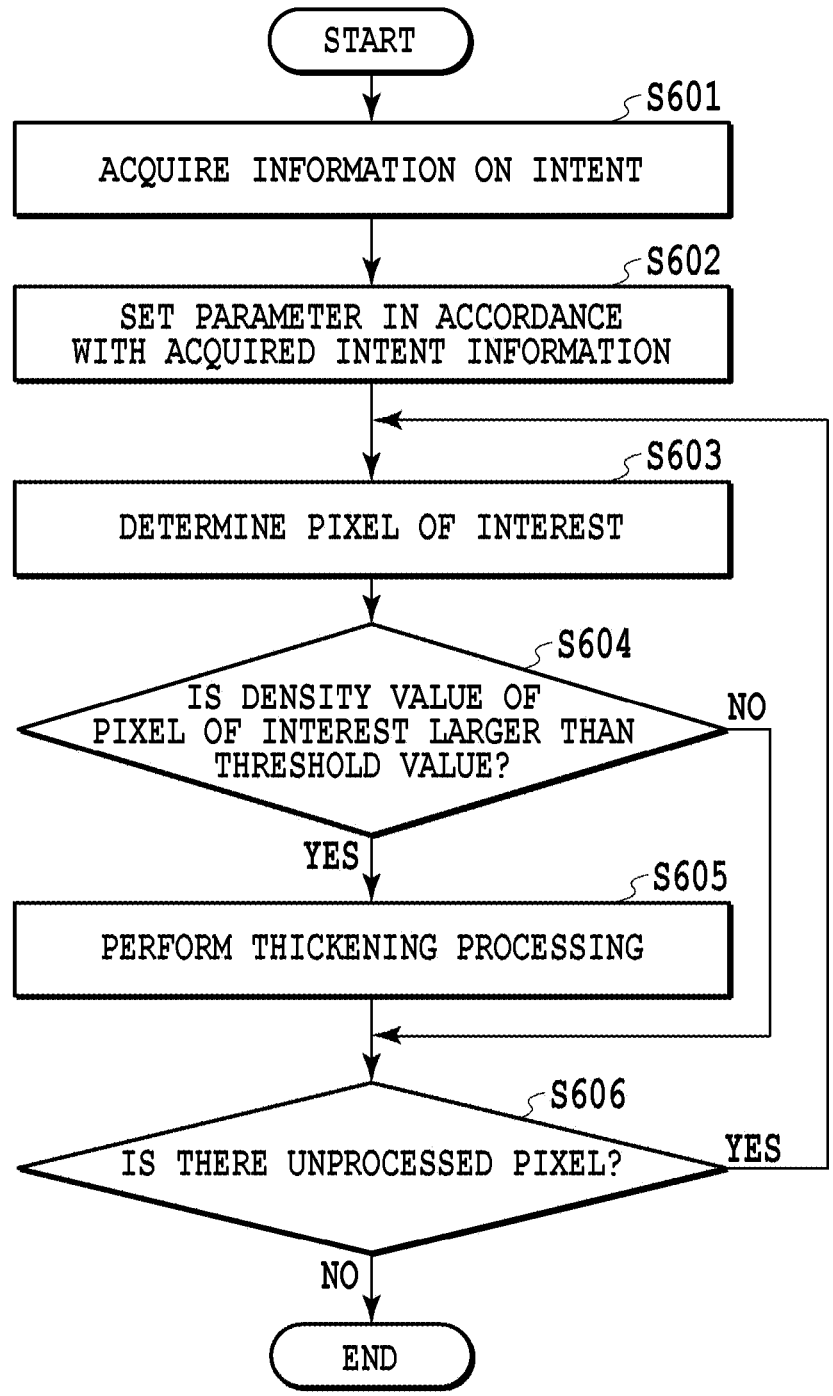
FIG. 6 is a diagram showing a control flow of a line width adjustment processing unit.

Following the above, a flow of control in the line width adjustment processing unit 235 is explained. As described above, in the present embodiment, in accordance with the setting of the intent in the color conversion processing, the parameter that is used for the line width adjustment processing is changed dynamically. FIG. 6 is a diagram showing a control flow of the line width adjustment processing unit 235. Here, explanation is given to the control in the case where a user sets the intent and gives instructions to perform printing via the printer driver of the PC 102 and thickens the character of an input image relating to the printing instructions. This series of processing is implemented by the CPU 111 loading a control program stored in the HDD 114 onto the RAM 113 and executing the control program. Although omitted in the control flow in FIG. 6, the series of processing to be described below is performed for each color plane of CMYK.

At step 601, the information on the intent, which is set via the printer driver, is acquired. At step 602 that follows, as the parameter corresponding to the set intent, a threshold value (lower limit value of a density to which thickening processing is applied) is set. Specifically, by referring to a table in which, for example, the kind of intent and the optimum threshold value are associated with each other, a threshold value in accordance with the intent is set. In the following, an example of a table that is referred to in the present embodiment is shown.

TABLE 1

| <Intent> | <Threshold value> |
|---|---|
| Saturation | 230 |
| Perceptual | 209 |
| . . . | . . . |

It is sufficient to create the table such as described above by finding an optimum threshold value for each intent based on the CMYK values obtained by performing color conversion processing for reference image data (RGB image data in which tone levels that can be represented are represented stepwise) and to store the table in the HDD 114. Normally, the table such as this is created for each color plane of CMYK, but it may also be possible to create a table common to all color planes.

At step 603, a pixel on which attention is focused (hereinafter, pixel of interest) is determined for the input image data relating to the printing instructions. Then, at step 604, by a comparison between the pixel value of the pixel of interest and the threshold value set at step 602, whether the pixel of interest has a density higher than or equal to a predetermined value is determined. In the case where the pixel value of the pixel of interest is larger than the threshold value set at step 602, the processing advances to step 605 and in the case where the pixel value of the pixel of interest is smaller than the threshold value, the processing advances to step 606. For example, in the case where the M plane in the specific example in FIG. 3A to FIG. 3C described previously is the processing target, on a condition that the set intent is "Saturation", the pixel value of the pixel of interest is "240" (see FIG. 3B). In this case, the threshold value that is set at step 602 is "230" and the pixel value of the pixel of interest is larger than "230", and therefore, the processing advances to step 605. On the other hand, in the case where the intent that is set is "Perceptual", the pixel value of the pixel of interest is "219" (see FIG. 3C). In this case, the threshold value that is set at step 602 is "209" and the pixel value of the pixel of interest is also larger than "209", and therefore, the processing advances to step 605. Then, at step 605, the thickening processing in units of pixels described previously is performed.

At step 606, whether there is an unprocessed pixel within the input image is determined. In the case where there is an unprocessed pixel, the processing returns to step 603 and the processing that takes the next pixel to be the pixel of interest is repeated. On the other hand, in the case where the processing has been completed for all the pixels within the input image, the present processing is terminated.

The above is the control flow of the line width adjustment processing in the present embodiment. As described above, in the case where the density of a text object within the input image data is in the vicinity of (R, G, B)=(255, 0, 255), even in the case where a user specifies any intent, it is made possible to increase the line width of a character similarly. In the case of the conventional method that uses the same threshold value irrespective of the intent, the results as described above are not obtained. It is supposed that the threshold value is a fixed value of "230" irrespective of the intent. In the case of the example in FIG. 3A to FIG. 3C, on a condition that the intent is "Saturation", the pixel value of the pixel of interest is "240", and therefore, this is larger than the threshold value, but on a condition that the intent is "Perceptual", the pixel value of the pixel of interest is "219", and therefore, this is smaller than the threshold value. In this case, whether or not to apply the thickening processing changes depending on the intent that is set, and therefore, the thickness of a character or the like that is output changes as a result.

Modification Example

In the above-described embodiment, the case is explained where the parameter in the line width adjustment processing is changed dynamically in accordance with the setting of the intent in the color conversion processing. Next, an aspect is explained as a modification example of the present embodiment, in which the parameter in the line width adjustment processing is changed dynamically in accordance with characteristics of a one-dimensional LUT that is used in the density correction processing. In this case, for example, it is sufficient to prepare a table in which each of the one-dimensional LUTs with a plurality of characteristics shown in FIG. 4 described previously and the optimum threshold value are associated with each other. Then, it is sufficient to, in the control flow in FIG. 6 described previously, acquire information on the characteristics of the one-dimensional LUT that is used in the density correction processing in place of the information on the intent (S601), and to set the threshold value in accordance with the acquired characteristics by referring to the above-described table (S602).

Further, it is also possible to obtain the same effect by changing the threshold value in the line width adjustment processing in accordance with, for example, the profile in the case where color conversion from CMYK into C'M'Y'K' is performed within the print image processing unit 232.

As above, according to the present embodiment, in accordance with the setting of the color conversion processing or the density correction processing, the optimum threshold value in the line width adjustment processing is set. Due to this, in the case where the input image data is the same, the line width adjustment processing is applied similarly irrespective of the setting of the color conversion processing or the density correction processing, and therefore, it is possible to appropriately control the thickness of a character or a line.

Second Embodiment

In the first embodiment, the aspect is explained in which the parameter setting in the line width adjustment processing is changed dynamically in accordance with the setting in the color conversion processing or the density correction processing. However, it is also possible to control the apparent thickness of a character or a line by processing to smooth the contour of a character or the like in the edge processing unit 239. Consequently, an aspect is explained as a second embodiment in which the parameter setting in the edge processing unit 239 is changed dynamically in accordance with the setting in the color conversion processing or the density correction processing. Explanation of the portions in common to those of the first embodiment is omitted or simplified and in the following, different points are explained mainly.

First, the influence of smoothing processing and jaggy reduction processing, which are processing to smooth the contour of a character or the like, in the edge processing unit 239 on a character or a line is explained. Here, the smoothing processing is processing to smooth the contour portion by adding or deleting a pixel at the contour portion of a character or an oblique line. The jaggy reduction processing is processing to reduce jaggies at the edge portion produced accompanying halftone processing by adding a pixel to the vacant area between dots making up the edge portion of a character or a line. In the following, each piece of the processing is explained in detail.

<Smoothing Processing>

Figure 7A:
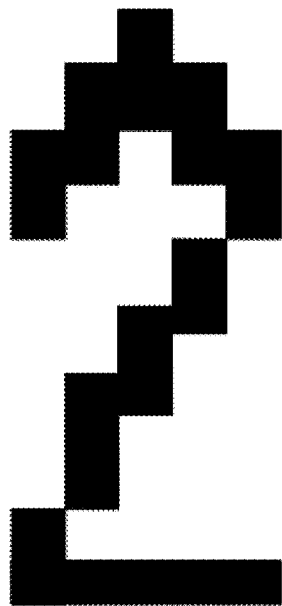
FIG. 7A and FIG. 7B are diagrams showing the way the contour portion of a character becomes smooth by smoothing processing in the case where on-pixels are added.
Figure 7B:
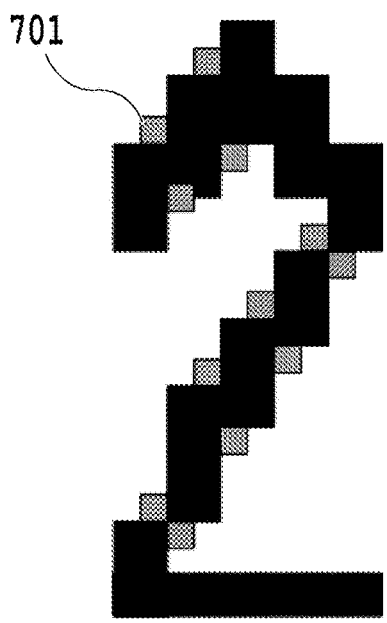

In the smoothing processing, for a high-density (for example, in the case where the pixel value is represented by an 8-bit value between 0 to 255, the pixel value is larger than or equal to 200) object of a character or a line, the roughness at the contour portion, which is produced by rendering, is smoothed by adding an on-pixel or conversely by deleting an on-pixel. The reason the density is limited to a density higher than or equal to a predetermined value is that in the case where an on-pixel is added to a character or a line whose density is low, the pixel become conspicuous, and therefore, the image quality deteriorates on the contrary. FIG. 7A and FIG. 7B are diagrams showing the way the contour portion of a character becomes smooth by the smoothing processing in the case where on-pixels are added. FIG. 7A shows the image before the smoothing processing is performed, for which rendering has been performed with, for example, a resolution of 600 DPI. FIG. 7B is the image after the smoothing processing is performed and it is known that on-pixels 701 are added to the outmost contour portion of the on-pixel group making up a figure "2".

Figure 8A:
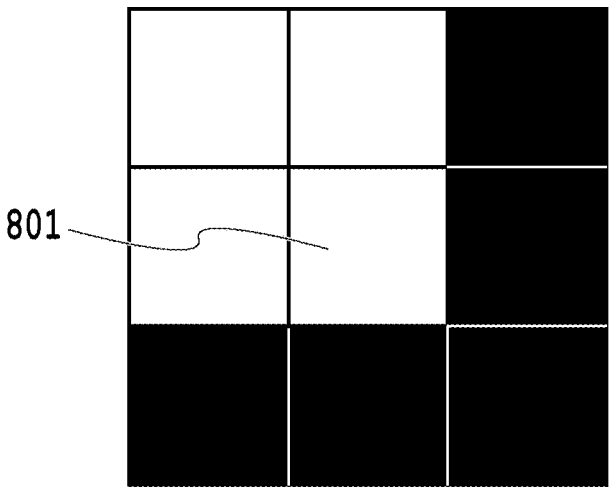
FIG. 8A and FIG. 8B are each a diagram showing an example of a pattern that is used for pattern matching.
Figure 8B:
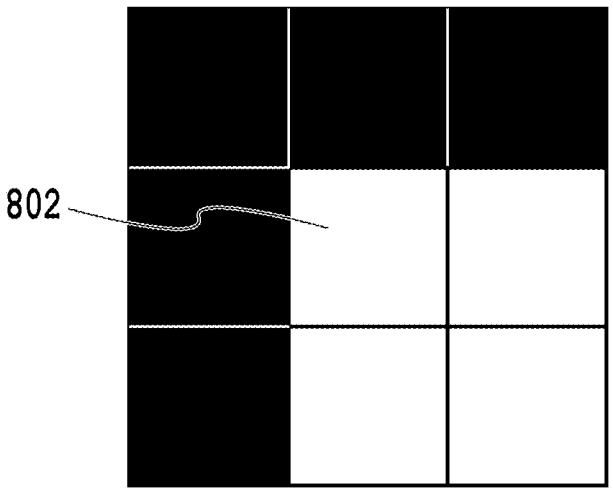
Figure 9:
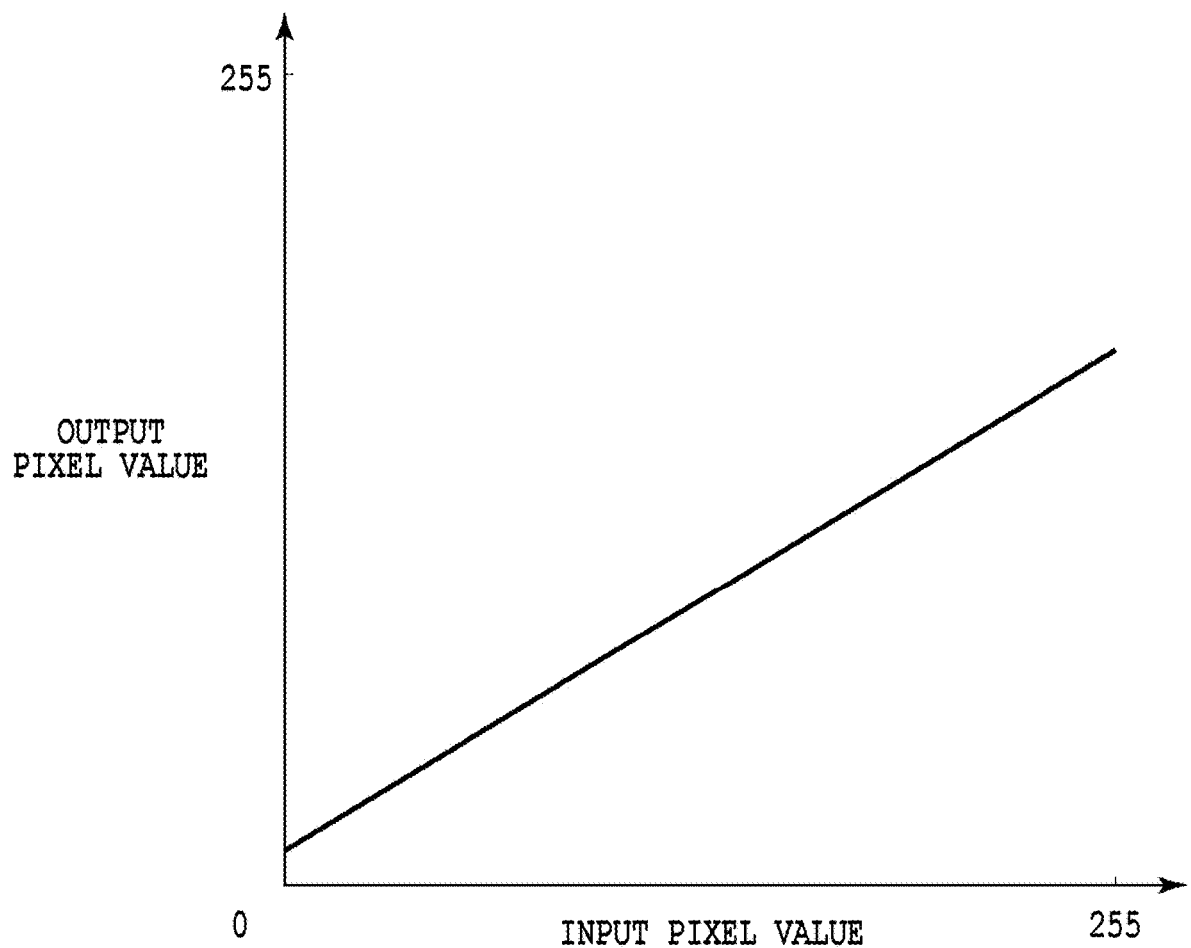
FIG. 9 is an example of a one-dimensional LUT that is used for determination of the density of an on-pixel to be added.

An outline of the processing in the case where smoothing is implemented by adding on-pixels is as follows. First, by using the image received from the toner amount control processing unit 236, whether or not to add on-pixels is determined. Specifically, whether there is a pixel having a density (pixel value) higher than or equal to the above-described threshold value within a 3×3 block whose center is the pixel of interest within the background area adjacent to the text area is determined. In the case where there is a pixel having a pixel value larger than or equal to the threshold value, determination by pattern matching is performed for the above-described 3×3 block whose center is the pixel of interest. In this pattern matching, in the case where the 3×3 block whose center is the pixel of interest matches with a pattern prepared in advance, it is determined that an on-pixel is added to the pixel of interest. It may also be possible to perform this determination by pattern matching for each color plane of CMYK, or to perform by weighting each plane of CMYK. FIG. 8A and FIG. 8B each show an example of a pattern that is used for pattern matching and each of white rectangles 801 and 802 represents a pixel of interest. Here, two kinds of pattern are illustrated, but it may also be possible to further use a different pattern. In the case where the position to which an on-pixel is added is determined, next, based on the image received from the gamma processing unit 237, the density of the on-pixel to be added is determined. For example, it is possible to find the density of the on-pixel to be added from the ratio between the on-pixel and the off-pixel in the eight pixels except for the pixel of interest within the above-described 3×3 block. In the examples in FIG. 8A and FIG. 8B, in the case where the pixel value of the on-pixel represented by the black rectangle is "255" and the pixel value of the off-pixel represented by the white rectangle is "0", the five pixels of the eight pixels are the on-pixels, and therefore, the pixel value (density) of the on-pixel to be added will be 255×5÷8≈160. Further, it may also be possible determine the density of the on-pixel to be added by using a one-dimensional LUT that takes the pixel value thus found as an input value. FIG. 9 is an example of the one-dimensional LUT that is used to determine the density of the on-pixel to be added. In the case of this LUT, a density higher than the input pixel value is determined as an output pixel value, and therefore, the character becomes apparently thick because the contour of the character is emphasized. At this time, it is possible to control the apparent thickness of the character by preparing a plurality of LUTs whose characteristics are different and by using different LUTs to be used depending on the purpose. In this manner, it is possible to control not only whether or not to add an on-pixel but also the apparent thickness (line width) of a character by controlling the density of an on-pixel to be added. The on-pixel whose density is thus determined is added to the pixel position determined as described above. On the other hand, in the case where a pixel is deleted, first, each pixel within the text area is taken to be a pixel of interest and whether there is a pixel whose pixel value is larger than or equal to a threshold value within a 3×3 block whose center is the pixel of interest is determined. In the case where there is a pixel whose pixel value is larger than or equal to the threshold value, determination by pattern matching is performed as in the above-described case where an on-pixel is added, and on a condition that the block matches with the pattern, the pixel of interest is changed into an off-pixel (or density is decreased).

The above is the contents of the smoothing processing. Due to this, it is also possible to smooth the contour of a text object or a line object whose density is higher than or equal to a predetermined value and at the same time, to control the apparent thickness (line width) thereof.

<Jaggy Reduction Processing>

Figure 10A:
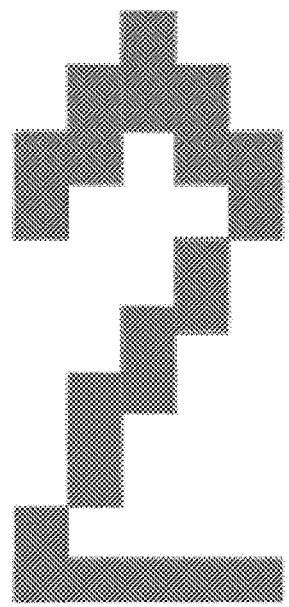
FIG. 10A to FIG. 10D are diagrams showing the way the edge portion of a character becomes smooth by jaggy reduction processing.
Figure 10B:
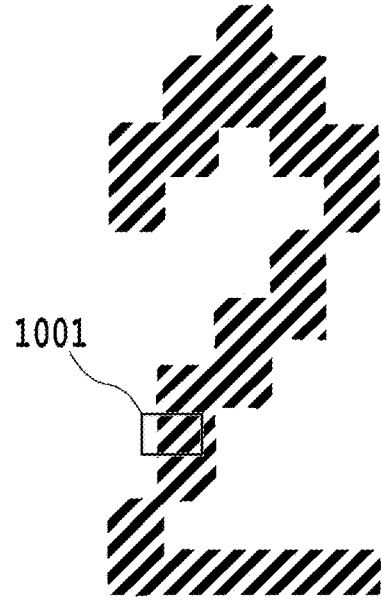
Figure 10C:
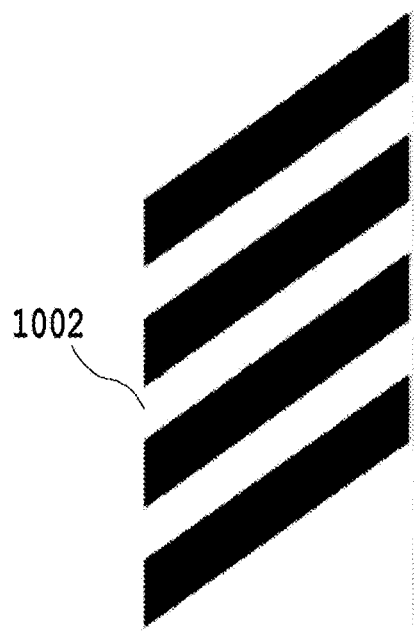
Figure 10D:
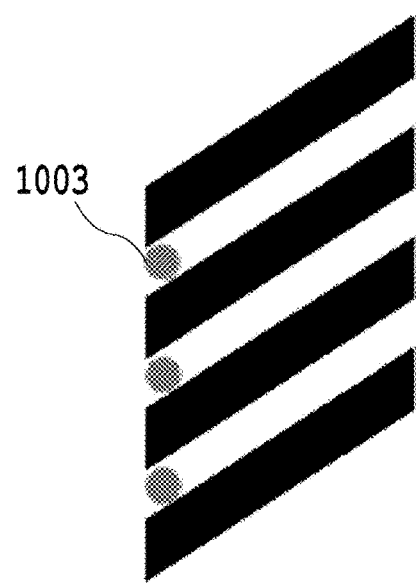

In the jaggy reduction processing, the vacant area between dots, that is, the gap between halftone dots at the edge portion of a halftone (for example, in the case where the pixel value is represented by an 8-bit value between 0 and 255, the pixel value is not less than 100 and not more than 200) text or line object is filled in. FIG. 10A to FIG. 10D are diagrams explaining the way the edge portion of a character becomes smooth by filling in the gap between halftone dots with an on-pixel by the jaggy reduction processing. FIG. 10A shows a gray multivalued character (contone image) before halftone processing is performed and FIG. 10B shows a binary character (halftone image) after halftone processing is performed. Then, FIG. 10C is a diagram in which a partial area 1001 in FIG. 10B is enlarged and symbol 1002 indicates a gap between halftone dots. FIG. 10D shows a state where an on-pixel 1003 is added to the gap 1002 between halftone dots at the edge portion. An outline of the jaggy reduction processing in the case of FIG. 10A to FIG. 10D is as follows. First, by using the image received from the toner amount control processing unit 236, whether or not to add an on-pixel is determined. Specifically, by taking each pixel at the edge portion of the text area to be a pixel of interest, whether the pixel value of the pixel of interest is larger than or equal to a threshold value is determined first. Then, in the case where the pixel value is larger than or equal to the threshold value, whether or not the pixel of interest corresponds to a gap between halftone dots is determined. Specifically, by comparing the image before the halftone processing, which is received from the gamma processing unit 237, and the image after the halftone processing, which is received from the halftone processing unit 238, whether a gap between halftone dots is produced at the edge portion is determined. Specifically, a comparison is made for one pixel at a time for each color plane and in the case where the pixel value is "0" in the halftone image and the pixel value is "other than 0" in the contone image, it is determined that there is a gap. Then, in the case where there is a gap between halftone dots, the pixel value of the pixel of interest in the contone image is determined to be the pixel value of an on-pixel to be added. Further, as at the time of the above-described smoothing processing, it may also be possible to determine the density of an on-pixel to be added by using the one-dimensional LUT that takes the determined pixel value as an input value. At this time, it is possible to control the apparent thickness of a character by preparing a plurality of LUTs with different characteristics and by using different LUTs to be used depending on the purpose. For example, by using an LUT whose output value is a density higher than an input value, it is possible to increase the apparent thickness of a character. In this manner, it is possible not only to add an on-pixel to the edge portion but also to control the apparent thickness (line width) of a character by controlling the density of an on-pixel to be added.

The above is the contents of the jaggy reduction processing. Due to this, it is possible not only to fill in the gap between halftone dots, which is produced at the edge portion of a halftone text object or a halftone line object, but also to control the apparent thickness (line width) of a character or a line.

Figure 11:
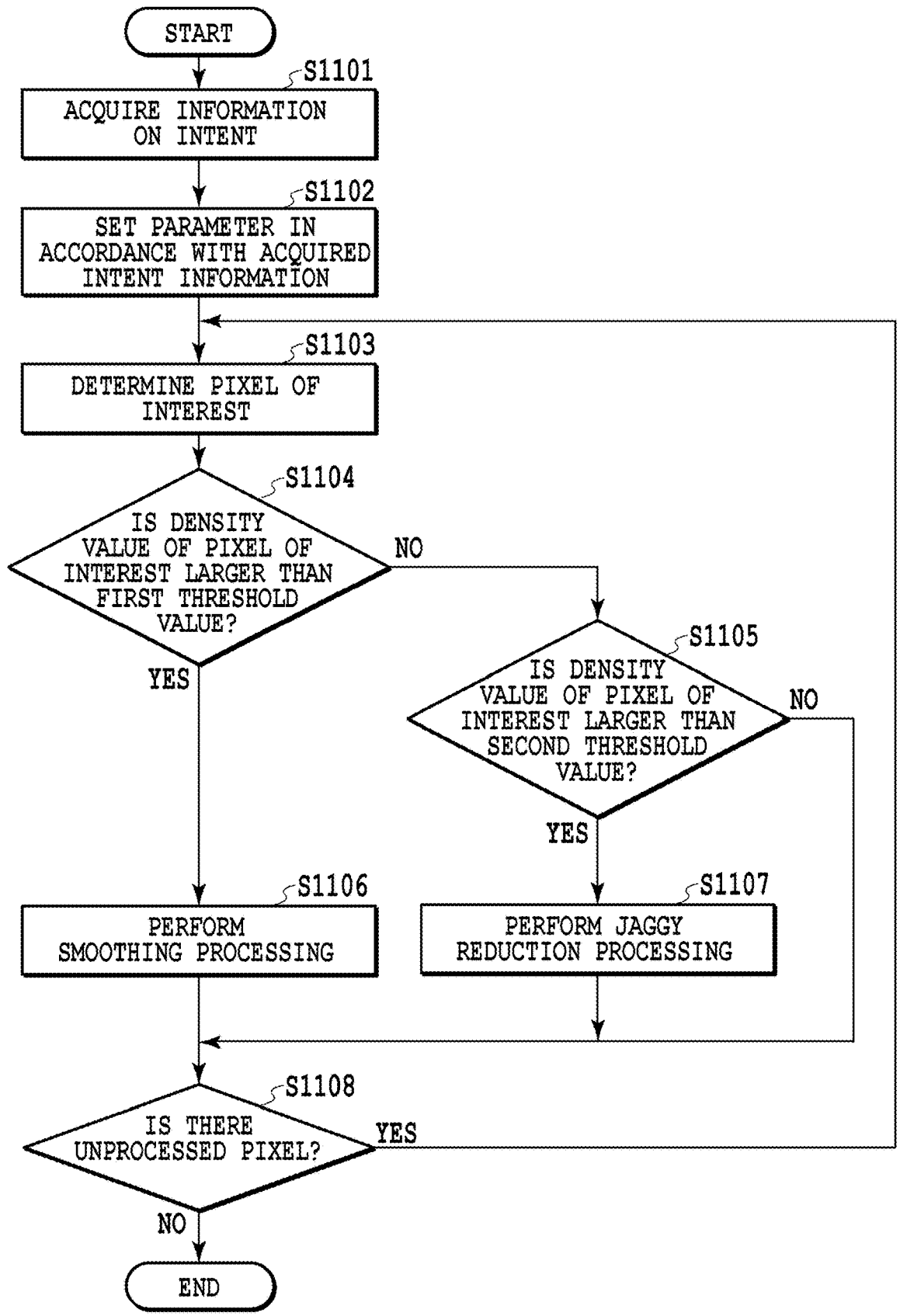
FIG. 11 is a diagram showing a control flow of an edge processing unit.

Following the above, a flow of control in the edge processing unit 239 according to the present embodiment is explained, in which the parameter to be used is dynamically changed and set in accordance with the setting of the intent in the color conversion processing. FIG. 11 is a diagram showing a control flow of the edge processing unit 239. This series of processing is implemented by the CPU 111 loading a control program stored in the HDD 114 onto the RAM 113 and executing the control program. Although omitted in the control flow in FIG. 11, this series of processing is performed for each color plane of CMYK.

At step 1101, information on the intent that is set via the printer driver is acquired. At step 1102 that follows, the parameter in accordance with the set intent is set. Specifically, in addition to two threshold values (first threshold value and second threshold value) that specify the lower limit value of a density to which the smoothing processing and the jaggy reduction processing are applied, a one-dimensional LUT to determine the density of an on-pixel to be added in both pieces of processing is set. At this time, for example, the contents of the intent and a table in which the first/second threshold values and a one-dimensional LUT are associated with each other are referred to and two threshold values in accordance with the intent and a one-dimensional LUT that is used for density determination are set. In the following, an example of the table of the present embodiment is shown.

TABLE 2

| <Intent> | <First threshold value/ second threshold value | <One-dimensional LUT> |
|---|---|---|
| Saturation | 200/100 | linear |
| Conceptual | 200/100 | upwardly convex |
| . . . | . . . | . . . |

Figure 12:
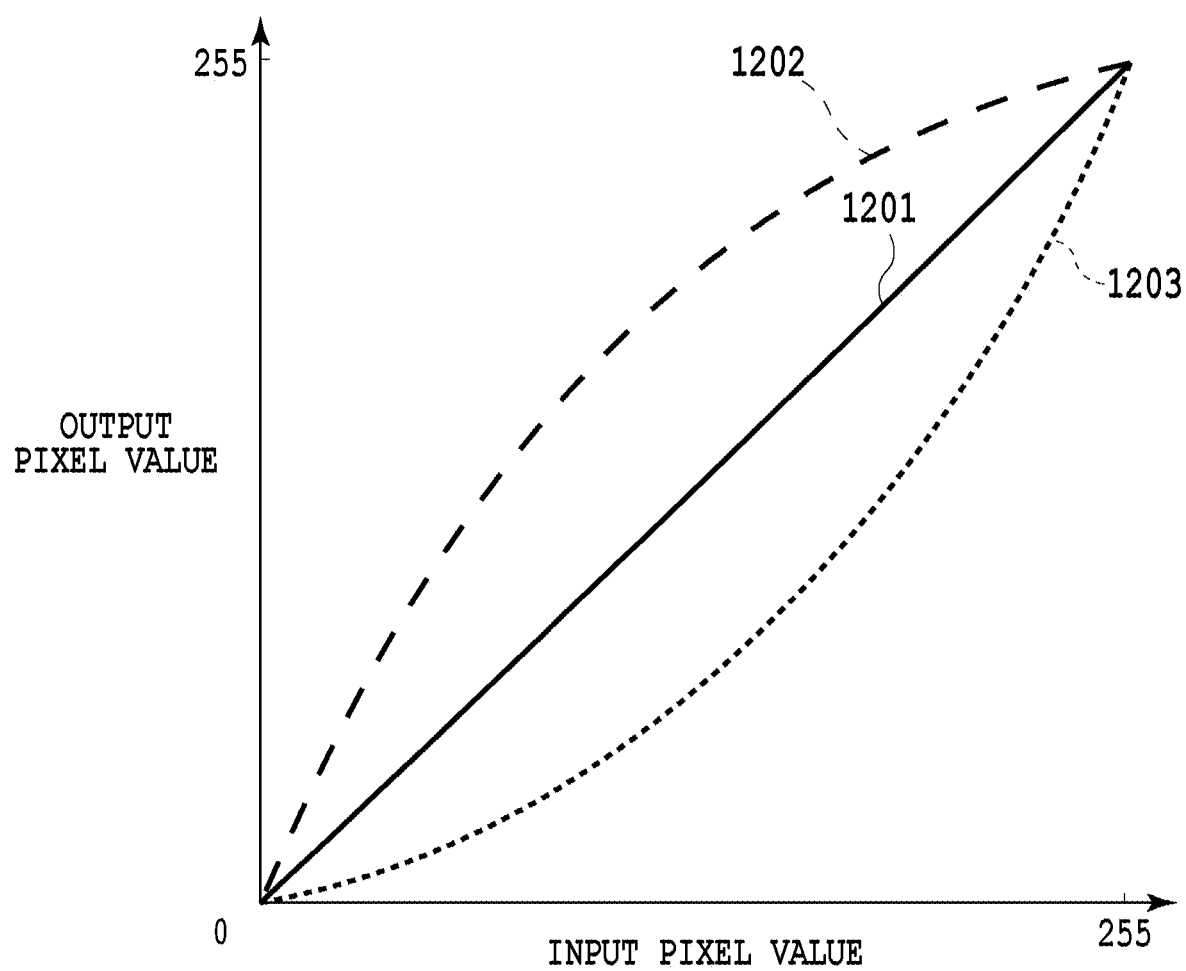
FIG. 12 is a diagram showing examples of one-dimensional LUTs for density determination.

FIG. 12 is a diagram showing examples of the one-dimensional LUTs for density determination. In FIG. 12, a straight line 1201 indicates linear characteristics that make the input pixel value and the output pixel value equal to each other. In contrast to this, a curve 1202 indicates upwardly convex characteristics that make the output pixel value larger than the input pixel value at a halftone density and a curve 1203 indicates downwardly convex characteristics that make the output pixel value smaller than the input pixel value at a halftone density. For example, in the case where the one-dimensional LUT with the upwardly convex characteristics is used, the edge is drawn denser, and therefore, it is possible to increase the apparent thickness of a character or the like. It is also sufficient to create the above-described table in advance by finding the optimum threshold value for each intent and so on, and to store the table in the HDD 114.

At step 1103, a pixel of interest is determined for input image data relating to printing instructions. Then, at step 1104, by a comparison between the pixel value of the pixel of interest and the first threshold value that is set at step 1102, whether the pixel of interest has a density higher than or equal to a predetermined value, which is suitable to the smoothing processing, is determined. In the case where the pixel value of the pixel of interest is smaller than the first threshold value, the processing advances to step 1105. On the other hand, in the case where the pixel value of the pixel of interest is larger than the first threshold value, the processing advances to step 1106 and then the smoothing processing is performed. At step 1105, by a comparison between the pixel value of the pixel of interest and the second threshold value, whether the pixel of interest has a density higher than or equal to a predetermined value, which is suitable to the jaggy reduction processing, is determined. In the case where the pixel value of the pixel of interest is larger than the second threshold value, the processing advances to step 1107 and then the jaggy reduction processing is performed. On the other hand, in the case where the pixel value of the pixel of interest is smaller than the second threshold value, the processing advances to step 1108. That is, for the pixel of interest whose pixel value is smaller than the second threshold value, neither smoothing processing nor jaggy reduction processing is performed.

At step 1106, for the pixel of interest, the smoothing processing described previously is performed and an on-pixel is added. The density of the on-pixel that is added at this time is determined by using the one-dimensional LUT that is set at step 1102 based on the density value within the 3×3 block whose center is the pixel of interest.

At step 1107, for the pixel of interest, the jaggy reduction processing described previously is performed and an on-pixel is added. The density of the on-pixel that is added at this time is determined by using the one-dimensional LUT that is set at step 1102 based on the density value within the 3×3 block whose center is the pixel of interest.

At step 1108, whether there is an unprocessed pixel within the input image is determined. In the case where there is an unprocessed pixel, the processing returns to step 1103 and the processing that takes the next pixel to be a pixel of interest is repeated. On the other hand, in the case where the processing has been completed for all the pixels within the input image, the present processing is terminated.

The above is the control of the line width adjustment processing in the present embodiment.

Figure 13A:
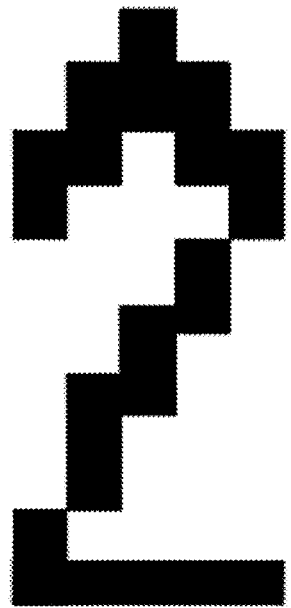
FIG. 13A to FIG. 13C are diagrams showing examples of results of color conversion processing.
Figure 13B:
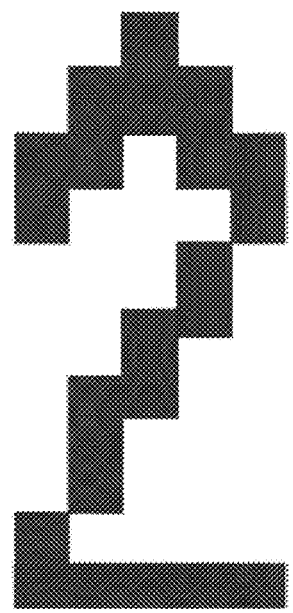

Here, explanation is given by using a specific example. For example, it is assumed that the results shown in FIG. 13A to FIG. 13C have been obtained in the color conversion processing. Here, (R, G, B)=(0, 255, 255) before the color conversion processing is performed is converted into (C, M, Y, K)=(210, 0, 30, 0) in the case of "Saturation" and into (C, M, Y, K)=(181, 0, 60, 0) in the case of "Perceptual". In this specific example, in the case where the C plane is the processing target, on a condition that the set intent is "Saturation", the pixel value of the pixel of interest is "210" (see FIG. 13B). The first threshold value that is set at step 1102 based on the table described previously is "200" in the case of "Saturation". In this case, the pixel value of the pixel of interest is larger than the first threshold value, and therefore, the processing advances to step 1106 and the smoothing processing is performed. The density of the on-pixel to be added in this smoothing processing is determined based on the one-dimensional LUT (straight line 1201 in FIG. 12) having linear characteristics.

Figure 13C:
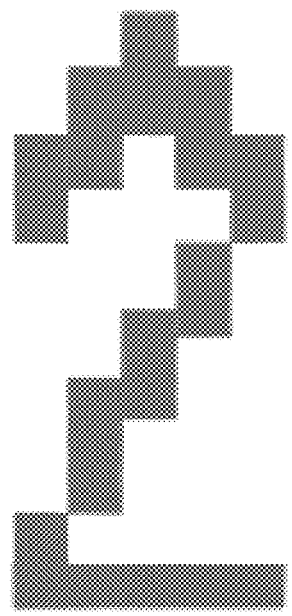

On the other hand, in the case where the set intent is "Perceptual", the pixel value of the pixel of interest is "181" (see FIG. 13C). The threshold value that is set at step 1102 based on the table described previously is "200" also in the case of "Perceptual". In this case, the pixel value of the pixel of interest is smaller than the first threshold value, and therefore, the processing advances to step 1105 and a comparison with the second threshold value is made. The second threshold value that is set in accordance with the table described previously is "100" and the pixel value of the pixel of interest, that is, "181", is larger, and therefore, the processing advances to step 1107 and the jaggy reduction processing is performed. Then, the density of the on-pixel to be added in this jaggy reduction processing is determined based on the one-dimensional LUT (curve 1202 in FIG. 12) having upwardly convex characteristics.

As above, in the present embodiment, also in the smoothing processing and the jaggy reduction processing in the edge processing unit 239, it is possible to adjust the apparent thickness of a character or a line. Then, for example, even in the case of a character or the like whose density is excluded from the target of the smoothing processing as the results of specifying "Perceptual" to the indent, it is made possible to appropriately control the line width in the jaggy reduction processing.

As above, according to the present embodiment, in accordance with the setting of the color conversion processing or the density correction processing, the optimum parameter in the smoothing processing or the jaggy reduction processing is set. Due to this, in the case where the input image data is the same, irrespective of the setting of the color conversion processing or the density correction processing, it is possible to appropriately control the apparent thickness of a character or a line. Further, according to the present embodiment, it is possible to exclude a character or the like whose density is low from the target of the smoothing processing, and therefore, the trouble described previously, which is caused by the smoothing processing, will not occur.

Third Embodiment

In the first and second embodiments, it is necessary to create and store in advance a table in which the optimum threshold value and the one-dimensional LUT are associated with each other, which is used at the time of dynamically changing the setting in the line width adjustment processing unit 235 or the edge processing unit 239. However, in the case where the table as described above is created and stored for all the alternatives that can be set in the color conversion processing or the density correction processing, the capacity of the storage unit included in the image forming apparatus 101 is consumed considerably and the load of control and design may become heavy. Consequently, an aspect is explained as a third embodiment in which the setting in the line width adjustment processing unit 235 or the edge processing unit 239 is automatically changed in conjunction with the change in the setting of the color conversion processing or the density correction processing. Explanation of the portions in common to those of the first and second embodiments is omitted or simplified and in the following, different points are explained mainly.

In the following, based on the second embodiment, an example is explained in which accompanying the change in the setting of the color conversion processing or the density correction processing, the setting in the edge processing unit 239 is changed automatically. In this case, in order to simplify explanation, explanation of the smoothing processing by extracting a pixel, which is performed by the edge processing unit 239, is omitted.

Here, it is assumed that as threshold values that specify the lower limit value of the density of a character or the like, which is the target of the smoothing processing, three levels, that is, "Low", "Medium", and "High" are provided. For example, "Low" specifies "200", "Medium" specifies "220", and "High" specifies "240". In this case, setting "Low" means that an on-pixel is added to a character or a line whose pixel value is "200" or more. Consequently, in the case where the density becomes considerably low (pixel value becomes considerably small) by the setting of the intent in the color conversion processing, by setting the threshold value level of the smoothing processing to "Low", it is possible to make an on-pixel more likely to be added. Further, it is also assumed that the density of an on-pixel to be added is determined by the above-described three kinds of one-dimensional LUT, that is, the downwardly convex, liner, and upwardly convex one-dimensional LUTs. As described previously, the upwardly convex one-dimensional LUT is optimum to the case where it is desired to increase the line width because the density becomes low (pixel value becomes small), and in the case where the density is sufficient (pixel value is sufficiently large) and the line width is kept, and therefore, it is not necessary to increase the width, the downwardly convex one-dimensional LUT is optimum. For the jaggy reduction processing, it is similarly assumed that as threshold values that specify the lower limit value of the density of a character or the like, which is the target of the processing, three levels are provided in such a manner that "Low" specifies "80", "Medium" specifies "100", and "High" specifies "120". It is also assumed that the density of an on-pixel to be added is determined by three kinds of one-dimensional LUT, that is, the downwardly convex, linear, and upwardly convex one-dimensional LUTs.

Base on the above-described premise, it is possible to roughly control the line width by preparing, for example, three kinds of adjustment level as below.

Adjustment level 1: an adjustment level in the case where the density becomes considerably low by the color conversion processing or the density correction processing, a combination of the setting of the threshold value to "Low" both in the smoothing processing and in the jaggy reduction processing and the determination of the density of an on-pixel to be added by the one-dimensional LUT with the upwardly convex characteristics Adjustment level 2: an adjustment level in the case where the density becomes slightly low by the color conversion processing or the density correction processing, a combination of the setting of the threshold value to "Medium" both in the smoothing processing and in the jaggy reduction processing and the determination of the density of an on-pixel to be added by the one-dimensional LUT with the linear characteristics Adjustment level 3: an adjustment level in the case where the density becomes high by the color conversion processing or the density correction processing, a combination of the setting of the threshold value to "High" both in the smoothing processing and in the jaggy reduction processing and the determination of the density of an on-pixel to be added by the one-dimensional LUT with the downwardly convex characteristics Of the above-described three kinds of adjustment level, Adjustment level 1 is effective in the case where it is highly required to increase the line width and the degree in which the line width is increased is large. Adjustment level 2 is effective in the case where it is not so highly required to increase the line width and the degree in which the line width is increased is not so large. Adjustment level 3 is effective in the case where it is almost not necessary to increase the line width and the degree in which the line width is increased may be small. Then, the above-described three kinds of adjustment level are prepared as alternatives in the edge processing unit 239 and it is designed so that the setting contents are switched in conjunction with the setting in the color conversion processing or the density correction processing. In the following, explanation is given by using a specific example.

Figure 14A:
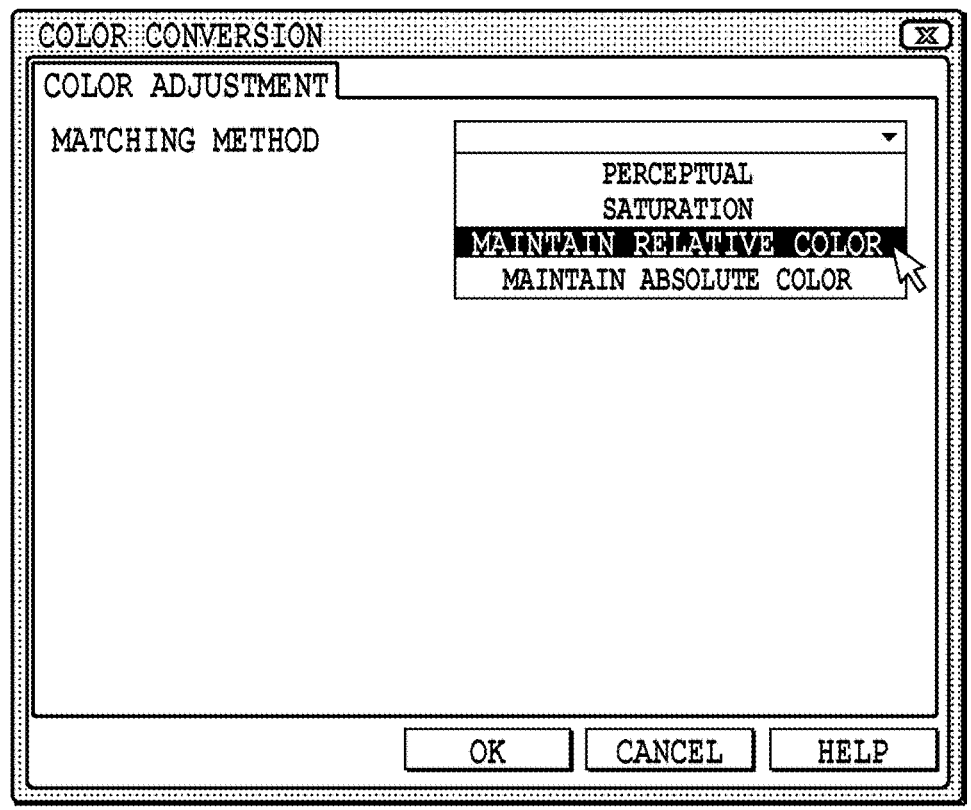
FIG. 14A is an example of a detailed setting UI screen of color conversion processing and FIG. 14B is an example of a detailed setting UI screen of density correction processing.
Figure 14B:
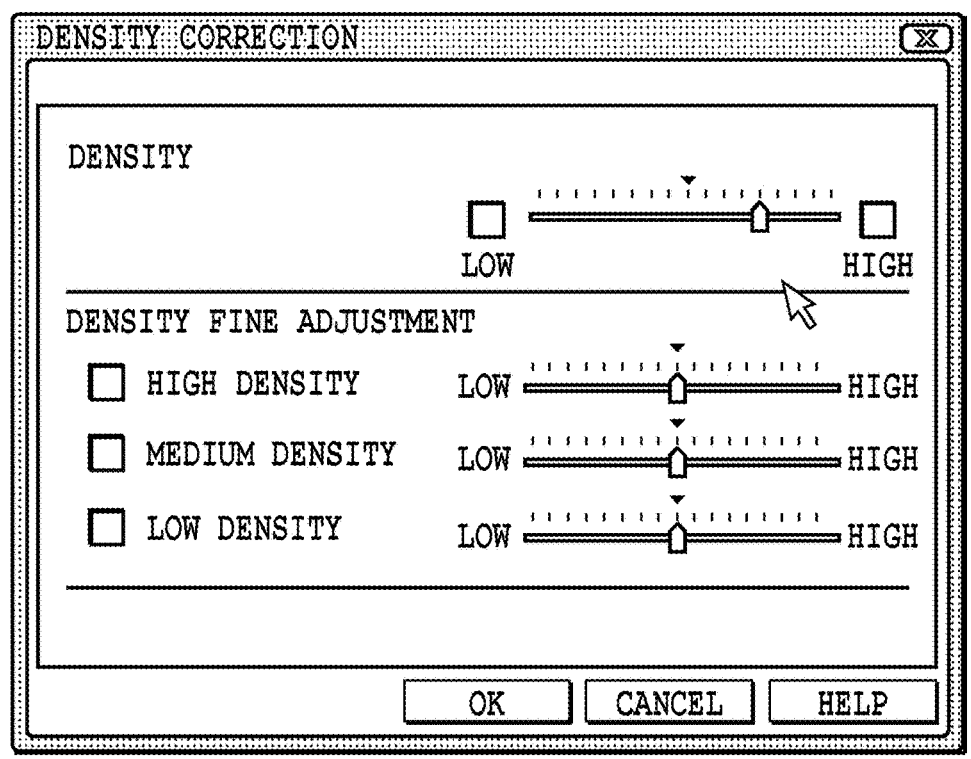
Figure 15:
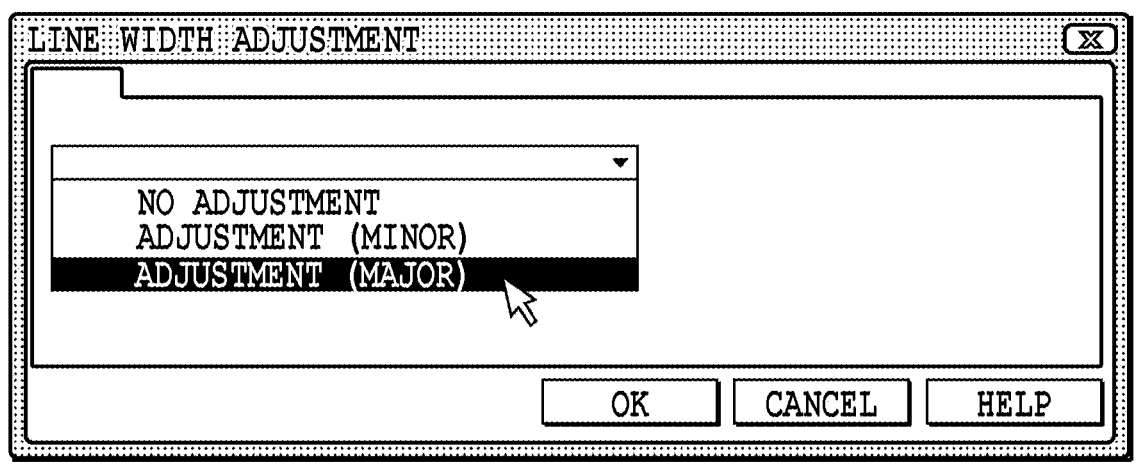
FIG. 15 is an example of a UI screen on which to set an adjustment level in smoothing processing and jaggy reduction processing.

FIG. 14A is an example of a detailed setting UI screen of the color conversion processing and FIG. 14B is an example of a detailed setting UI screen of the density correction processing. FIG. 15 is an example of a UI screen on which to set the above-described three kinds of adjustment level in the smoothing processing and the jaggy reduction processing. In the alternatives in the drop-down list on the UI screen in FIG. 15, "No adjustment" corresponds to Adjustment level 3, "Adjustment (minor)" corresponds to Adjustment level 2, and "Adjustment (major)" corresponds to Adjustment level 1. Then, in the present embodiment, for example, it is designed so that in the case where a user selects "Perceptual" that significantly lowers the density of an input image on the UI screen in FIG. 14A, the adjustment level that is set on the UI screen in FIG. 15 is automatically switched to "Adjustment (major)" in conjunction with the operation. Similarly, it is designed so that in the case where a user selects "Saturation" that only slightly lowers the density of an input image, the adjustment level is automatically switched to "Adjustment (minor)". Alternatively, it is designed so that in accordance with the position to which the knob on a slide bar on the UI screen in FIG. 14B has been moved, the adjustment level is automatically switched to another in such a manner that in the case where the degree in which the density is decreased is large, the adjustment level is automatically switched to "Adjustment (major)" and in the case where the degree in which the density is increased is large, the adjustment level is automatically switched to "No adjustment". As described above, by designing the switching so that the setting of the image processing to control the thickness of a character or a line is automatically switched to another in accordance with the intent setting or the like of the color conversion processing, it is possible for a user to save time and effort to perform the setting for line width adjustment. Further, it is sufficient to prepare only several kinds of adjustment level, each adjustment level being a combination of the threshold value that specifies the lower limit value of the density of a character or the like, which is the processing target, and the one-dimensional LUT that is used to determine the density of an on-pixel to be added, and therefore, a reduction in the load of control and design will result.

In the present embodiment, the settings both in the smoothing processing and in the jaggy reduction processing performed by the edge processing unit 239 are changed dynamically, but it may also be possible to change only one of them.

As above, according to the present embodiment, it is possible to obtain the same effects as those of the first and second embodiments by a simpler configuration.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Even in the case where the setting of color conversion processing or density correction processing is changed, it is possible to control the thickness of a character or a line to the same width as long as input image data is the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-214943 filed Nov. 2, 2016, which is hereby incorporated by reference wherein in its entirety.

What is claimed is:

1. An apparatus that performs a density correction process on an input image and then a thickening process for thickening a line in the input image of which the density has been corrected and thereafter forms the processed input image on a printing medium, the apparatus comprising a controller having a processor and a memory, the controller configured to:
correct, based on a density correction parameter, a density of an input image by using the density correction process;
set, based on the density correction parameter used in the density correction process, a threshold value that specifies a lower limit value of a density of an edge of a line to be thickened by the line thickening process, wherein the set threshold value is lower than a maximum density value;
determine an edge of a line, the edge of the line having a density higher than or equal to the set threshold value in the input image, of which the density has been corrected; and
thicken the line of which the density has been corrected by using the thickening process, wherein the thickening process darkens a pixel that is next to the determined edge and is outside the line.

2. The apparatus according to claim 1, wherein the determined edge includes an edge having a density higher than or equal to the threshold value.

3. The apparatus according to claim 2, wherein the determined edge is thickened by adding a density to a pixel between halftone dots generated by the halftoning.

4. The apparatus according to claim 1, wherein the controller is configured to halftone the input image of which the density has been corrected; and
wherein the determined edge is thickened by smoothing the determined edge on the halftoned input image.

5. The apparatus according to claim 1, wherein an image is formed by the apparatus on a printing medium, the image being formed on the printing medium based on the density-corrected input image with the thickened edge by using a color material.

6. The apparatus according to claim 1, wherein the controller is configured to set a higher threshold value in a case that the density correction parameter is a parameter for darkening the input image, and set a lower threshold value in a case that the density correction parameter is a parameter for lightening the input image.

7. The apparatus according to claim 1, wherein in said correction based on a density correction parameter, a density of an edge of a line in the input image is corrected.

8. The apparatus according to claim 1, wherein the density correction parameter is set differently based on differences in intent of color conversion processing by which the input image is generated.

9. The apparatus according to claim 1, wherein the edge of the line corresponds to a text area and the outside of the line corresponds to a background area.

10. An image forming method in an apparatus that performs a density correction process on an input image and then a thickening process for thickening a line in the input image of which the density has been corrected and thereafter forms the processed input image on a printing medium, the apparatus having a controller comprised of a processor and a memory, the method comprising steps executed by the controller of:
correcting, based on a density correction parameter, a density of an input image by using the density correction process;
setting, based on the density correction parameter used in the density correction process, a threshold value that specifies a lower limit value of a density of an edge of a line to be thickened by the line thickening process, wherein the set threshold value is lower than a maximum density value;
determining an edge of a line, the edge of the line having a density higher than or equal to the set threshold value in the input image, of which the density has been corrected; and
thickening the line of which the density has been corrected by using the thickening process, wherein the thickening process darkens a pixel that is next to the determined edge and is outside the line.

11. A non-transitory computer readable storage medium storing a program for causing a computer to perform an image forming method in an apparatus that performs a density correction process on an input image and then a thickening process for thickening a line in the input image of which the density has been corrected and thereafter forms the processed input image on a printing medium, the apparatus having a controller comprised of a processor and a memory, the method comprising steps executed by the controller of:
correcting, based on a density correction parameter, a density of an input image by using the density correction process;
setting, based on the density correction parameter used in the density correction process, a threshold value that specifies a lower limit value of a density of an edge of a line to be thickened by the line thickening process, wherein the set threshold value is lower than a maximum density value;
determining an edge of a line, the edge of the line having a density higher than or equal to the set threshold value in the input image, of which the density has been corrected; and
thickening the line of which the density has been corrected by using the thickening process, wherein the thickening process darkens a pixel that is next to the determined edge and is outside the line.

* * * * *